United States Patent
Zong

(10) Patent No.: US 11,160,004 B2
(45) Date of Patent: Oct. 26, 2021

(54) HANDOVER METHOD, DEVICE, AND SYSTEM

(71) Applicant: Huawei Technologies Co., Ltd., Shenzhen (CN)

(72) Inventor: Zaifeng Zong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 19 days.

(21) Appl. No.: 16/709,362

(22) Filed: Dec. 10, 2019

(65) Prior Publication Data

US 2020/0120571 A1    Apr. 16, 2020

Related U.S. Application Data

(63) Continuation of application No. PCT/CN2018/096203, filed on Jul. 19, 2018.

(30) Foreign Application Priority Data

Jul. 20, 2017 (CN) .......................... 201710597349.1
Oct. 13, 2017 (CN) .......................... 201710953564.0

(51) Int. Cl.
  *H04W 36/32* (2009.01)
  *H04W 76/11* (2018.01)
  (Continued)

(52) U.S. Cl.
  CPC ............. *H04W 36/32* (2013.01); *H04W 8/08* (2013.01); *H04W 36/0033* (2013.01); *H04W 76/11* (2018.02)

(58) Field of Classification Search
  CPC ....... H04W 36/32; H04W 76/11; H04W 8/08; H04W 36/0033; H04W 36/0016;
  (Continued)

(56) References Cited

U.S. PATENT DOCUMENTS

2010/0311419 A1    12/2010 Bi
2013/0021970 A1    1/2013  Lei
(Continued)

FOREIGN PATENT DOCUMENTS

CN    103002530 A    3/2013
CN    102714838 B    6/2014
(Continued)

OTHER PUBLICATIONS

Bertin, Philippe, Servane Bonjour, and Jean-Marie Bonnin. "Distributed or centralized mobility?." GLOBECOM 2009-2009 IEEE Global Telecommunications Conference. IEEE, 2009. (Year: 2009).*
(Continued)

*Primary Examiner* — Sharad Rampuria
(74) *Attorney, Agent, or Firm* — Conley Rose, P.C.

(57) ABSTRACT

A handover method, a device, and a system to ensure that after an access and mobility management function (AMF) entity determines to no longer serve some terminals, a current ongoing procedure of a terminal in these terminals is not interrupted. The method includes: receiving, by a target mobility management entity, a message related to a target terminal; and sending, by the target mobility management entity, the message related to the target terminal to a source mobility management entity that currently serves the target terminal.

22 Claims, 5 Drawing Sheets

(51) Int. Cl.
*H04W 8/08* (2009.01)
*H04W 36/00* (2009.01)

(58) Field of Classification Search
CPC ....... H04W 8/065; H04W 36/12; H04W 8/24; H04L 47/10; H04L 47/12; H04L 47/20; H04L 47/24; H04L 47/32; H04L 47/38; H04L 47/70; H04L 47/72; H04L 47/74; H04L 47/78; H04L 47/80
See application file for complete search history.

(56) References Cited

U.S. PATENT DOCUMENTS

| | | |
|---|---|---|
| 2014/0185586 A1 | 7/2014 | Wu et al. |
| 2016/0050601 A1 | 2/2016 | Jeong et al. |
| 2017/0374542 A1 | 12/2017 | Ryu et al. |
| 2018/0049074 A1* | 2/2018 | Xu ................ H04W 36/08 |
| 2018/0132150 A1 | 5/2018 | Du |
| 2019/0075497 A1 | 3/2019 | Zhu et al. |

FOREIGN PATENT DOCUMENTS

| | | |
|---|---|---|
| CN | 105704763 A | 6/2016 |
| CN | 106211244 A | 12/2016 |
| CN | 106604331 A | 4/2017 |
| EP | 3445086 A1 | 2/2019 |
| WO | 2013165168 A1 | 11/2013 |
| WO | 2016024848 A1 | 2/2016 |
| WO | 2016114611 A1 | 7/2016 |
| WO | 2017190296 A1 | 11/2017 |

OTHER PUBLICATIONS

Su, Dongming, et al. "A self-optimizing mobility management scheme based on cell ID information in high velocity environment." 2010 Second International Conference on Computer and Network Technology. IEEE, 2010. (Year: 2010).*

S2-143799, Samsung, "Additional GUTI for the dedicated MME," 3GPP TSG SA WG2 Meeting #105, Oct. 13-17, 2014, Sapporo, Japan, 6 pages.

S2-171485, Nokia, et al., "Way forward for change of AMF / Control of N2 persistence," SA WG2 Meeting #119, Feb. 13-17, 2017, Dubrovnik, Croatia, 7 pages.

"3rd Generation Partnership Project; Technical Specification Group Services and System Aspects; System Architecture for the 5G System; Stage 2 (Release 15)," 3GPP TS 23.501, V1.0.0, Jun. 2017, 146 pages.

"3rd Generation Partnership Project; Technical Specification Group Services and System Aspects; Procedures for the 5G System; Stage 2 (Release 15)," 3GPP TS 23.502, V0.4.0, May 2017, 126 pages.

SA WG2, "Presentation of TR 23.501: System Architecture for the 5G System (Release 15) to TSG SA for Approval," SP-170384, 3GPP TSG SA Meeting #76, Jun. 7-9, 2017, 2 pages.

* cited by examiner

HANDOVER METHOD, DEVICE, AND SYSTEM

CROSS-REFERENCE TO RELATED APPLICATIONS

This application is a continuation of International Patent Application No. PCT/CN2018/096203, filed on Jul. 19, 2018, which claims priority to Chinese Patent Application No. 201710597349.1 filed on Jul. 20, 2017 and Chinese Patent Application No. 201710953564.0 filed on Oct. 13, 2017, all of which are hereby incorporated herein by reference in their entireties.

TECHNICAL FIELD

This application relates to the field of communications technologies, and in particular, to a handover method, a device, and a system.

BACKGROUND

In other approaches, when an access and mobility management function (AMF) entity determines to no longer serve a terminal, the AMF entity sends an "unavailable" indication to a radio access network (RAN) device, and the RAN device marks the AMF entity as unavailable. The AMF entity is not to be considered during subsequent AMF entity selection. In addition, after receiving the "unavailable" indication, the RAN device releases next generation (N) 2 interfaces (N2 for short) of all terminals served by the AMF entity. Subsequently, if the RAN device needs to send a message related to a terminal originally served by the AMF entity, the RAN device sends the message related to the terminal to a target AMF entity designated by the AMF entity or a target AMF entity that is selected by the RAN device for the terminal.

However, if the terminal originally served by the AMF entity has an ongoing procedure, because the RAN device has released an N2 interface of the terminal served by the AMF entity, the RAN device cannot send the message related to the terminal to the original AMF entity. This causes interruption of the current procedure of the terminal and affects user experience.

SUMMARY

Embodiments of this application provide a handover method, a device, and a system, in order to ensure that after an AMF entity determines to no longer serve some terminals, a current ongoing procedure of a terminal in these terminals is not interrupted.

To achieve the foregoing objective, the embodiments of this application provide the following technical solutions.

According to a first aspect, a handover method is provided. The method includes: receiving, by a target mobility management entity, a message related to a target terminal; and sending, by the target mobility management entity, the message related to the target terminal to a source mobility management entity that currently serves the target terminal. In the handover method provided in this embodiment of this application, after receiving the message related to the target terminal, the target mobility management entity may send the message related to the target terminal to the source mobility management entity, such that the source mobility management entity can continue to serve the terminal. Therefore, it can be ensured that after the source mobility management entity determines to no longer serve the target terminal, a current ongoing procedure of the target terminal is not interrupted.

In a possible design, the method further includes: receiving, by the target mobility management entity, an identifier list from the source mobility management entity, where the identifier list is a list of identifiers of terminals currently having ongoing procedures in to-be-handed-over terminals served by the source mobility management entity. Additionally, sending, by the target mobility management entity, the message related to the target terminal to a source mobility management entity that currently serves the target terminal includes: sending, by the target mobility management entity based on the identifier list, the message related to the target terminal to the source mobility management entity that currently serves the target terminal. In the handover method provided in this embodiment of this application, the source mobility management entity sends, to the target mobility management entity, the list of the identifiers of the terminals currently having the ongoing procedures in the served to-be-handed-over terminals, and after receiving the message related to the target terminal, the target mobility management entity sends the message related to the target terminal to the source mobility management entity based on the identifier list, such that the source mobility management entity can continue to serve the terminal. Therefore, it can be ensured that after the source mobility management entity determines to no longer serve the target terminal, a current ongoing procedure of the target terminal is not interrupted.

Optionally, the message related to the target terminal carries an identifier of the target terminal. Additionally, sending, by the target mobility management entity based on the identifier list, the message related to the target terminal to the source mobility management entity that currently serves the target terminal includes: if the identifier list includes the identifier of the target terminal, sending, by the target mobility management entity, the message related to the target terminal to the source mobility management entity that currently serves the target terminal.

Optionally, the message related to the target terminal carries the identifier of the target terminal, and the method further includes determining, by the target mobility management entity based on the identifier of the target terminal and a correspondence between the identifier of the target terminal and information about the source mobility management entity, the source mobility management entity that serves the target terminal. In this solution, the source mobility management entity that serves the target terminal can be determined.

Optionally, the method further includes: after the target mobility management entity receives a context of the target terminal, deleting, by the target mobility management entity, the correspondence between the identifier of the target terminal and the information about the source mobility management entity. In this solution, after the target mobility management entity receives the message related to the target terminal, the target mobility management entity may serve the target terminal, instead of sending the message related to the target terminal to the source mobility management entity.

In a possible design, the message related to the target terminal carries an identifier of the target terminal. Additionally, sending, by the target mobility management entity, the message related to the target terminal to a source mobility management entity that currently serves the target terminal includes: searching for, by the target mobility management entity, a context of the target terminal based on the identifier of the target terminal; and sending, by the target mobility management entity if the target mobility management entity fails to find the context of the target terminal, the message related to the target terminal to the source mobility management entity that currently serves the target terminal. In this solution, after receiving the message related to the target terminal, the target mobility management entity searches for the context of the target terminal based on the identifier of the target terminal that is carried in the message related to the target terminal, and if the context of the target terminal is not found, sends the message related to the target terminal to the source mobility management entity, such that the source mobility management entity can continue to serve the terminal. Therefore, it can be ensured that after the source mobility management entity determines to no longer serve the target terminal, a current ongoing procedure of the target terminal is not interrupted.

Optionally, the message related to the target terminal carries a group identifier of a terminal group in which the target terminal is located, and the method further includes: receiving, by the target mobility management entity, a context of at least one terminal from the source mobility management entity, where the context of the at least one terminal includes a group identifier of at least one terminal group, and a context of each terminal in the context of the at least one terminal includes a group identifier of a terminal group in which the terminal is located. Additionally, sending, by the target mobility management entity if the target mobility management entity fails to find the context of the target terminal, the message related to the target terminal to the source mobility management entity that currently serves the target terminal includes: if the target mobility management entity fails to find the context of the target terminal, and the group identifier of the at least one terminal group includes the group identifier of the terminal group in which the target terminal is located, sending, by the target mobility management entity, the message related to the target terminal to the source mobility management entity that currently serves the target terminal. In other words, in this solution, the message related to the target terminal is sent to the source mobility management entity only after it is determined that the target terminal is a terminal served by the source mobility management entity, such that procedure accuracy can be ensured.

Optionally, the message related to the target terminal carries the group identifier of the terminal group in which the target terminal is located, and the method further includes: determining, by the target mobility management entity based on the group identifier of the terminal group in which the target terminal is located and a correspondence between the group identifier of the terminal group in which the target terminal is located and information about the source mobility management entity, the source mobility management entity that serves the target terminal. In this solution, the source mobility management entity that serves the target terminal can be determined.

Optionally, the method further includes: receiving, by the target mobility management entity, the information about the source mobility management entity from the source mobility management entity; or determining, by the target mobility management entity, the information about the source mobility management entity based on configuration information. In this solution, the information about the source mobility management entity can be obtained.

Optionally, the message related to the target terminal is a downlink message. Additionally, sending, by the target mobility management entity, the message related to the target terminal to a source mobility management entity that currently serves the target terminal includes: sending, by the target mobility management entity to a session management entity, the message related to the target terminal and the information about the source mobility management entity that currently serves the target terminal, where the information about the source mobility management entity is used by the session management entity to send the message related to the target terminal to the source mobility management entity. In other words, after determining the source mobility management entity that serves the terminal, the target mobility management entity may redirect the message related to the target terminal to the source mobility management entity via the session management entity.

Optionally, the method further includes: sending, by the target mobility management entity, indication information to the session management entity, where the indication information is used to indicate that the information about the source mobility management entity is used only for a current procedure initiated by the session management entity. In other words, after the current procedure ends, if the session management entity needs to initiate a new procedure, the session management entity needs to send the message related to the target terminal to the target mobility management entity or a mobility management entity that is reselected by the session management entity for the target terminal.

According to a second aspect, a handover method is provided. The method includes: obtaining, by a source mobility management entity, a list of identifiers of terminals currently having ongoing procedures in to-be-handed-over terminals served by the source mobility management entity; sending, by the source mobility management entity, the identifier list to a target mobility management entity; receiving, by the target mobility management entity, the identifier list from the source mobility management entity; and after the target mobility management entity receives a message related to a target terminal, sending, by the target mobility management entity, the message related to the target terminal to the source mobility management entity based on the identifier list. In other words, in the handover method provided in this embodiment of this application, the source mobility management entity sends, to the target mobility management entity, the list of the identifiers of the terminals currently having the ongoing procedures in the served to-be-handed-over terminals, and after receiving the message related to the target terminal, the target mobility management entity sends the message related to the target terminal to the source mobility management entity based on the identifier list, such that the source mobility management entity can continue to serve the terminal. Therefore, it can be ensured that after the source mobility management entity determines to no longer serve the target terminal, a current ongoing procedure of the target terminal is not interrupted.

According to a third aspect, a target mobility management entity is provided. The target mobility management entity has a function of implementing the method in the first aspect. The function may be implemented by hardware, or may be implemented by hardware by executing corresponding software. The hardware or the software includes one or more modules corresponding to the function.

According to a fourth aspect, a target mobility management entity is provided, including: a processor, a memory, a bus, and a communications interface. The memory is configured to store a computer executable instruction. The processor is connected to the memory through the bus. When the target mobility management entity runs, the processor executes the computer executable instruction stored in the memory, such that the target mobility management entity performs the handover method in any design of the first aspect.

According to a fifth aspect, a computer-readable storage medium is provided. The computer-readable storage medium stores an instruction, and when the instruction is run on a computer, the computer performs the handover method in any design of the first aspect.

According to a sixth aspect, a computer program product including an instruction is provided. When the instruction is run on a computer, the computer performs the handover method in any design of the first aspect.

According to a seventh aspect, a chip system is provided. The chip system includes a processor configured to support a target mobility management entity in implementing functions in the foregoing aspect, for example, receiving a message related to a target terminal, and sending the message related to the target terminal to a source mobility management entity. In a possible design, the chip system further includes a memory. The memory is configured to store a program instruction and data that are necessary for the target mobility management entity. The chip system may include a chip, or may include a chip and another discrete device.

For technical effects brought by any design in the third aspect to the seventh aspect, refer to the technical effects brought by different designs in the first aspect. Details are not described herein again.

According to an eighth aspect, a handover system is provided. The handover system includes a source mobility management entity and a target mobility management entity. The source mobility management entity is configured to obtain a list of identifiers of terminals currently having ongoing procedures in to-be-handed-over terminals served by the source mobility management entity. The source mobility management entity is further configured to send the identifier list to the target mobility management entity. The target mobility management entity is configured to receive the identifier list from the source mobility management entity. The target mobility management entity is further configured such that after receiving a message related to a target terminal, the target mobility management entity sends the message related to the target terminal to the source mobility management entity based on the identifier list.

For technical effects brought by the eighth aspect, refer to the technical effects brought by the second aspect. Details are not described herein again.

These aspects or other aspects of this application are more comprehensible in descriptions of the following embodiments.

DESCRIPTION OF EMBODIMENTS

The following describes the technical solutions in the embodiments of this application with reference to accompanying drawings in the embodiments of this application. In the description of this application, unless otherwise stated, "/" means "or", for example, A/B may represent A or B; "and/or" in this specification is merely an association relationship for describing associated objects, and represents that three relationships may exist, for example, A and/or B may represent the following three cases: Only A exists, both A and B exist, and only B exists. In addition, in the description of this application, unless otherwise stated, "a plurality of" means two or more.

A network architecture and a service scenario that are described in the embodiments of this application are intended to more clearly describe the technical solutions in the embodiments of this application, and do not constitute a limitation on the technical solutions provided in the embodiments of this application. A person of ordinary skill in the art may know that, as the network architecture evolves and a new service scenario appears, the technical solutions provided in the embodiments of this application are also applicable to a similar technical problem.

Figure 1:
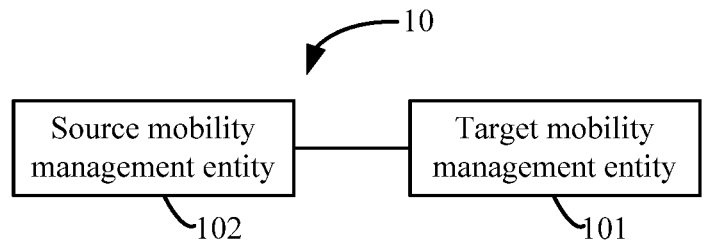
FIG. 1 is a schematic architectural diagram of a handover system according to an embodiment of this application.

FIG. 1 is a schematic architectural diagram of a handover system 10 according to an embodiment of this application. The handover system includes a target mobility management entity 101 and a source mobility management entity 102. The source mobility management entity 102 is a mobility management entity that serves a terminal before the terminal is handed over. The target mobility management entity 101 is a mobility management entity that serves the terminal after the terminal is handed over. A general description is provided herein, and not repeated below.

A message related to the target terminal may be an uplink message related to the target terminal, or may be a downlink message related to the target terminal. The uplink message related to the target terminal may be an uplink message that is sent by an access device to the target mobility management entity 101 when the access device needs to initiate an N2 message related to the target terminal, for example, an uplink N2 message; or may be an uplink message sent by the target terminal to the target mobility management entity 101, for example, an uplink non-access stratum (NAS) message. The downlink message related to the target terminal may be a downlink message sent by a network device to the access device, for example, a downlink N2 message; or may be a downlink message sent by a network device to the target terminal, for example, a downlink NAS message; or may be a downlink message sent by a network device to the target mobility management entity 101. This is not specifically limited in this embodiment of this application. The network device may be, for example, a session management function entity.

The target mobility management entity 101 is further configured to send the message related to the target terminal to the source mobility management entity 102 that currently serves the target terminal.

The source mobility management entity 102 is configured to receive the message related to the target terminal from the target mobility management entity 101.

The source mobility management entity 102 and the target mobility management entity 101 in FIG. 1 may directly communicate with each other, or may communicate with each other through forwarding by another network device. This is not specifically limited in this embodiment of this application.

In the handover system provided in this embodiment of this application, after receiving the message related to the target terminal, the target mobility management entity may send the message related to the target terminal to the source mobility management entity, such that the source mobility management entity can continue to serve the terminal. Therefore, it can be ensured that after the source mobility management entity determines to no longer serve the target terminal, a current ongoing procedure of the target terminal is not interrupted.

Optionally, the handover system 10 may be applied to a 5th Generation (5G) network and another network in the future. This is not specifically limited in this embodiment of this application.

Figure 2:
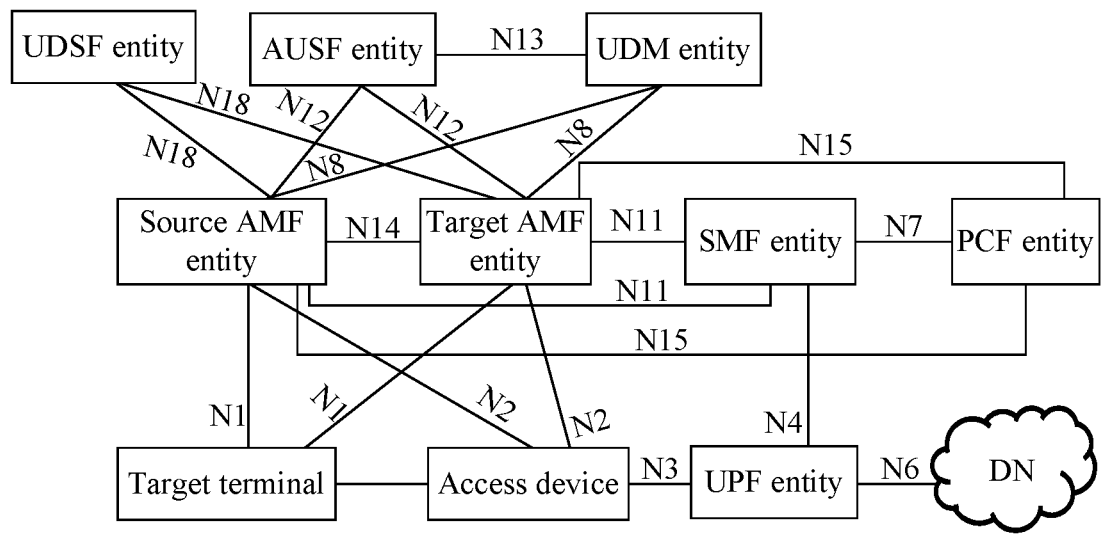
FIG. 2 is a schematic architectural diagram of a fifth generation (5G) network according to an embodiment of this application.

If the handover system 10 is applied to the 5G network, as shown in FIG. 2, a network element or an entity corresponding to the target mobility management entity 101 may be a target access and mobility management function (AMF) entity, and a network element or an entity corresponding to the source mobility management entity 102 may be a source AMF entity.

In addition, as shown in FIG. 2, the 5G network may further include an access device, a user plane function (UPF) entity, a unified data management (UDM) entity, an authentication server function (AUSF) entity, a session management function (SMF) entity, a policy control function (PCF) entity, and the like. Optionally, the 5G network may further include an unstructured data storage function (UDSF) entity.

In this embodiment of this application, a target terminal accesses a network using the access device, and communicates with a source AMF entity and a target AMF entity each through a next generation (N) 1 interface (N1 for short). The source AMF entity communicates with the target AMF entity through an N14 interface (N14 for short). The source AMF entity and the target AMF entity each communicate with the access device through an N2 interface (N2 for short). The source AMF entity and the target AMF entity each communicate with the UDSF entity through an N18 interface (N18 for short). The source AMF entity and the target AMF entity each communicate with the AUSF entity through an N12 interface (N12 for short). The source AMF entity and the target AMF entity each communicate with the UDM entity through an N8 interface (N8 for short). The source AMF entity and the target AMF entity each communicate with the SMF entity through an N11 interface (N11 for short). The source AMF entity and the target AMF entity each communicate with the PCF entity through an N15 interface (N15 for short). The AUSF entity communicates with the UDM entity through an N13 interface (N13 for short). The SMF entity communicates with the UPF entity through an N4 interface (N4 for short). The UPF entity communicates with a data network (DN) through an N6 interface (N6 for short).

It should be noted that, a name for each interface between the network elements in FIG. 2 is merely an example, and there may be another name for the interface during specific implementation. This is not specifically limited in this embodiment of this application.

It should be noted that, the access device, the source AMF entity, the target AMF entity, the SMF entity, the UDSF entity, the AUSF entity, the UDM entity, the UPF entity, the PCF entity, and the like in FIG. 2 are merely names, and the names do not constitute limitations on devices. In the 5G network and another network in the future, network elements or entities corresponding to the access device, the source AMF entity, the target AMF entity, the SMF entity, the UDSF entity, the AUSF entity, the UDM entity, the UPF entity, and the PCF entity may have other names. This is not specifically limited in this embodiment of this application. For example, the UDM entity may be replaced with a home subscriber server (HSS), a user subscription database (USD), or a database entity. A general description is provided herein, and not repeated below.

Optionally, the terminal in this embodiment of this application may include various handheld devices, in-vehicle devices, wearable devices, computing devices that have a wireless communication function, or another processing device connected to a wireless modem, and may further include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, a user equipment (UE), a mobile station (MS), a terminal device, or the like. For ease of description, in this application, the foregoing devices are collectively referred to as a terminal.

Optionally, the access device in this embodiment of this application is a device that accesses a core network, for example, may be a base station, a broadband network gateway (BNG), an aggregation switch, or a non-3GPP access device. The base station may include various forms of base stations, such as a macro base station, a micro base station (also referred to as a small cell), a relay station, and an access point.

Optionally, for a function of the source AMF entity in this embodiment of this application, refer to the function of the source mobility management entity in FIG. 1; for a function of the target AMF entity in this embodiment of this application, refer to the function of the target mobility management entity in FIG. 1. Details are not described herein again. In addition, the source AMF entity and the target AMF entity may further be responsible for functions such as registration management, mobility management, and lawful interception. This is not specifically limited in this embodiment of this application.

Optionally, the SMF entity in this embodiment of this application is configured to perform session management, including session-related control functions such as session setup, session modification, session release, allocation and management of an Internet Protocol (IP) address of a terminal, selection and control of a UPF entity, and lawful interception.

Optionally, the UPF entity in this embodiment of this application may be responsible for processing functions such as terminal packet forwarding and statistics collection. For example, the UPF entity can implement user plane functions of a serving gateway (SGW) and a packet data network gateway (PGW). Alternatively, the UPF entity may be a software-defined networking (SDN) switch. This is not specifically limited in this embodiment of this application.

Optionally, the AUSF entity in this embodiment of this application is configured to authenticate a terminal based on subscription data of the terminal.

Optionally, the UDM entity in this embodiment of this application is configured to store subscription data. In addition, the UDM entity further includes functions such as authentication, user identifier processing, and subscription management. This is not specifically limited in this embodiment of this application.

Optionally, the PCF entity in this embodiment of this application includes policy-related functions such as providing a policy rule and supporting a unified policy framework in managing network behavior.

Optionally, the UDSF entity provided in this embodiment of this application is configured to store unstructured data of a network entity.

Optionally, the target mobility management entity 101 in FIG. 1 may be implemented by one physical device, or may be implemented by a plurality of physical devices together, or may be a logical functional module in a physical device. This is not specifically limited in this embodiment of this application.

Figure 3:
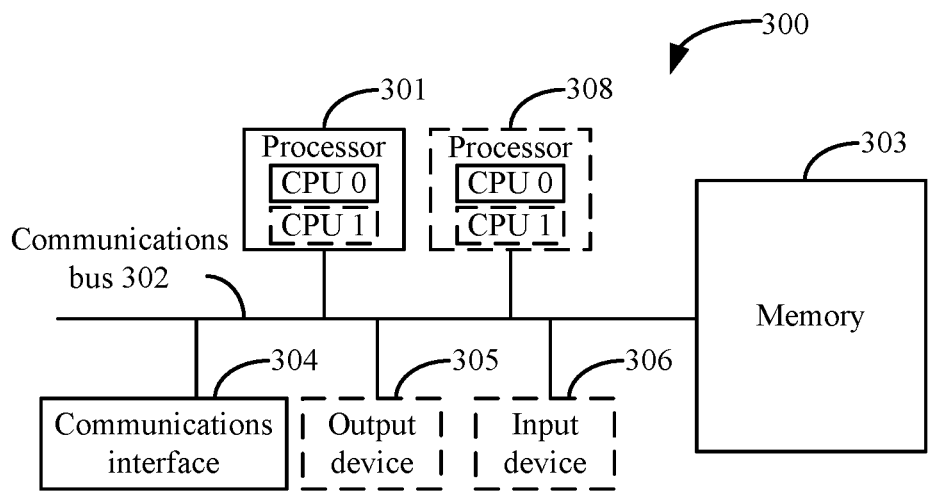
FIG. 3 is a schematic diagram of a hardware structure of a communications device according to an embodiment of this application.

For example, the target mobility management entity 101 in FIG. 1 may be implemented using a communications device in FIG. 3. FIG. 3 is a schematic diagram of a hardware structure of a communications device according to an embodiment of this application. The communications device 300 includes at least one processor 301, a communications bus 302, a memory 303, and at least one communications interface 304.

The processor 301 may be a general-purpose central processing unit (CPU), a microprocessor, an application-specific integrated circuit (ASIC), or one or more integrated circuits configured to control program execution of a solution of this application.

The communications bus 302 may include a path to transfer information between the foregoing components.

The communications interface 304 is any apparatus such as a transceiver, and is configured to communicate with another device or a communications network such as the Ethernet, a radio access network (RAN), or a wireless local area network (wireless local area networks, WLAN).

The memory 303 may be, but is not limited to, a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, optical disc storage (including a compact disc, a laser disc, an optical disc, a digital versatile disc, and a Blu-ray disc, or the like), or magnetic disk storage medium or another magnetic storage device, or any other medium that can be used to carry or store expected program code in an instruction or data structure form and can be accessed by a computer. The memory may exist independently, and is connected to the processor through the bus. Alternatively, the memory may be integrated with the processor.

The memory 303 is configured to store application program code for executing a solution of this application, and the processor 301 controls execution. The processor 301 is configured to execute the application program code stored in the memory 303 to implement a handover method provided in the following embodiment of this application.

During implementation, in an embodiment, the processor 301 may include one or more CPUs, for example, a CPU 0 and a CPU 1 shown in FIG. 3.

During implementation, in an embodiment, the communications device 300 may include a plurality of processors, for example, the processor 301 and a processor 308 shown in FIG. 3. Each of these processors may be a single-core (single-CPU) processor, or may be a multi-core (multi-CPU) processor. The processor herein may be one or more devices, circuits, and/or processing cores for processing data (for example, a computer program instruction).

During implementation, in an embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive user input in a plurality of manners. For example, the input device 306 may be a mouse, a keyboard, a touchscreen device, or a sensing device.

The communications device 300 may be a general-purpose communications device or a dedicated communications device. During implementation, the communications device 300 may be a desktop computer, a portable computer, a network server, a personal digital assistant (PDA), a mobile phone, a tablet computer, a wireless terminal device, a built-in device, or a device that has a structure similar to that in FIG. 3. A type of the communications device 300 is not limited in this embodiment of this application.

A handover method provided in an embodiment of this application is described below with reference to FIG. 1 to FIG. 3.

Figure 4:
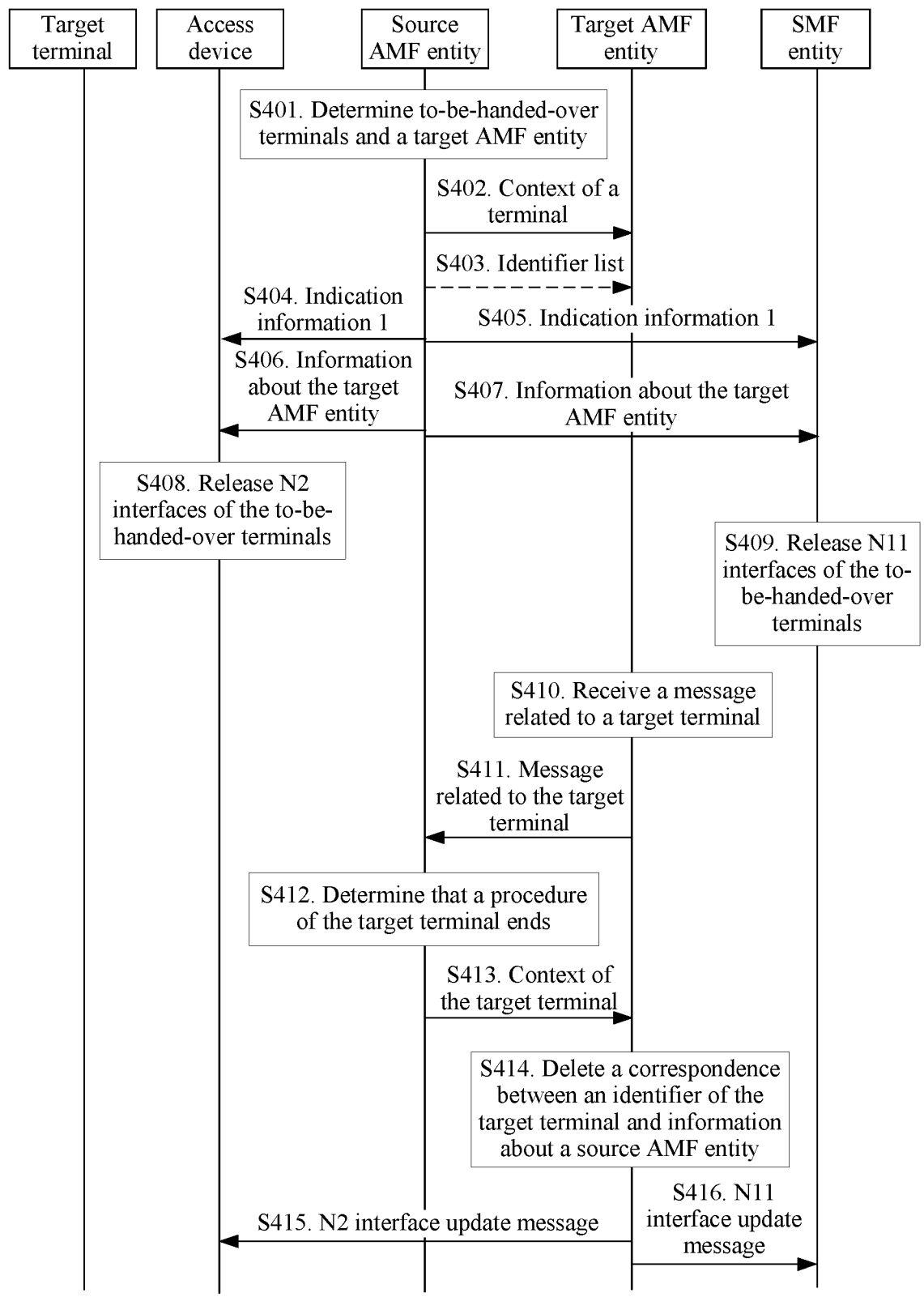
FIG. 4 is a schematic flowchart 1 of a handover method according to an embodiment of this application.

For example, the handover system shown in FIG. 1 is applied to the 5G network shown in FIG. 2. It is assumed that a source AMF entity determines to move all or some terminals served by the source AMF entity to a target AMF entity due to upcoming shutdown, scale-down, or another reason, and the target AMF entity serves these terminals. FIG. 4 is a schematic flowchart of a handover method according to an embodiment of this application. In the handover method, the source AMF entity sends, to the target AMF entity, a list of identifiers of terminals currently having ongoing procedures in the served to-be-handed-over terminals, and after receiving a message related to a target terminal, the target AMF entity sends the message related to the target terminal to the source AMF entity based on the identifier list. After the source AMF entity determines that a procedure of the target terminal ends, the source AMF entity sends a context of the target terminal to the target AMF entity through an N14 interface between the source AMF entity and the target AMF entity, such that the target terminal can be handed over from the source AMF entity to the target AMF entity without interrupting the current procedure of the target terminal. The handover method includes the following steps.

S401. A source AMF entity determines to-be-handed-over terminals, and determines a target AMF entity that is to serve the to-be-handed-over terminals.

In this embodiment of this application, the to-be-handed-over terminals may be all terminals served by the source AMF entity, or may be some terminals served by the source AMF entity, for example, a group of terminals including a same group identifier. This is not specifically limited in this embodiment of this application.

It should be noted that, in this embodiment of this application, the source AMF entity may divide all the terminals served by the source AMF entity into groups based on a local policy or another factor, and configure a corresponding group identifier for each group of terminals, for ease of management. The group identifier herein may be a globally unique AMF identifier (GUAMI) of the source AMF entity. A general description is provided herein, and not repeated below.

S402. The source AMF entity sends, to the target AMF entity, a context of a terminal currently having no ongoing procedure in the to-be-handed-over terminals, such that the target AMF entity receives the context of the terminal currently having no ongoing procedure.

Optionally, in this embodiment of this application, after receiving the context of the terminal currently having no ongoing procedure, the target AMF entity may store the context of the terminal currently having no ongoing procedure.

S403. The source AMF entity sends, to the target AMF entity, a list of identifiers of terminals currently having ongoing procedures in the to-be-handed-over terminals, such that the target AMF entity receives the identifier list from the source AMF entity.

In the to-be-handed-over terminals determined by the source AMF entity, if some terminals have ongoing procedures, for example, some terminals are performing a re-registration procedure or a handover procedure, for these terminals having the ongoing procedures, the source AMF entity may temporarily not send contexts of these terminals to the target AMF entity, but send identifiers of these terminals to the target AMF entity, and notify the target AMF entity that these terminals continue to be served by the source AMF entity currently.

In this embodiment of this application, an identifier of a terminal may include at least one of a globally unique temporary identity (GUTI) of the terminal, a subscription permanent identifier (SUPI) of the terminal, an AMF N2 application layer protocol (N2AP) terminal identifier of the terminal that is allocated by the source AMF entity to the terminal, the AMF N2 application layer protocol (N2AP) terminal identifier of the terminal that is allocated by the source AMF entity to the terminal and a group identifier of a terminal group in which the terminal is located, an access device N2AP terminal identifier of the terminal that is allocated by an access device to the terminal and an identifier of the access device, or another available identifier. This is not specifically limited in this embodiment of this application.

In this embodiment of this application, a terminal identifier carried in an uplink message and a terminal identifier carried in a downlink message each are one of the foregoing terminal identifiers. In addition, the terminal identifier carried in the uplink message and the terminal identifier carried in the downlink message may be different. For example, the terminal identifier carried in the uplink message may include the GUTI, the AMF N2AP terminal identifier of the terminal that is allocated by the AMF entity to the terminal, the AMF N2AP terminal identifier of the terminal and the group identifier of the terminal group in which the terminal is located, the access device N2AP terminal identifier of the terminal and the identifier of the access device, or another available identifier, and the terminal identifier carried in the downlink message may include the SUPI, the GUTI, or another available identifier. A general description is provided herein, and not repeated below.

Optionally, in this embodiment of this application, after receiving the identifier list, the target AMF entity may store the identifier list.

Optionally, in this embodiment of this application, after receiving the identifier list, the target AMF entity may store a correspondence between information about the identifier list and information about the source AMF entity, or store a correspondence between a terminal identifier in the identifier list and information about the source AMF entity. This is not specifically limited in this embodiment of this application.

The information about the identifier list may be, for example, a number of the identifier list. The information about the source AMF entity may be, for example, an address of the source AMF entity or a name of the source AMF entity. This is not specifically limited in this embodiment of this application.

Optionally, in this embodiment of this application, the identifier list in step S403 and the context of the terminal in step S402 may be sent to the target AMF entity using a same message, or may be sent to the target AMF entity using different messages. This is not specifically limited in this embodiment of this application.

Optionally, in this embodiment of this application, the information about the source AMF entity may be sent to the target AMF entity together with the identifier list in step S403 or the context of the terminal in step S402. For example, the information about the source AMF entity is sent to the target AMF entity together with the identifier list in step S403 or the context of the terminal in step S402 using a same message, or is sent to the target AMF entity as a source address of a message. Certainly, the information about the source AMF entity may be alternatively configured in the target AMF entity. For example, a correspondence between an IP address of the source AMF entity to the target AMF entity and the information about the source AMF entity is configured in the target AMF entity, such that the target AMF entity can query the correspondence based on a source IP address of a received message that carries the identifier list in step S403 or the context of the terminal in step S402, to obtain the information about the source AMF entity. This is not specifically limited in this embodiment of this application.

S404. The source AMF entity sends indication information 1 to an access device, such that the access device receives the indication information 1 from the source AMF entity.

The indication information 1 is used to indicate that the source AMF entity is unavailable or some group identifiers in the source AMF entity are unavailable. For example, if the to-be-handed-over terminals are all the terminals served by the source AMF entity, the indication information 1 is used to indicate that the source AMF entity is unavailable. Alternatively, for example, if the to-be-handed-over terminals are the group of terminals including the same group identifier, the indication information 1 is used to indicate that the group identifier of the terminal group in the source AMF entity is unavailable.

It should be noted that, in this embodiment of this application, that the group identifier is unavailable means that terminals in the terminal group corresponding to the group identifier are no longer served. A general description is provided herein, and not repeated below.

S405. The source AMF entity sends the indication information 1 to an SMF entity, such that the SMF entity receives the indication information 1 from the source AMF entity.

For a related description of the indication information 1, refer to step S404. Details are not described herein again.

It should be noted that, this embodiment of this application is merely described using an example in which the source AMF entity sends the indication information 1 to the SMF entity on a core network side. Certainly, the SMF entity in this embodiment of this application may be replaced with another core network device. For example, the source AMF entity may alternatively send the indication information 1 to a UDM entity or an AUSF entity. This is not specifically limited in this embodiment of this application.

S406. The source AMF entity sends, to the access device, information about the target AMF entity that is to serve the to-be-handed-over terminals, such that the access device receives the information about the target AMF entity from the source AMF entity.

In this embodiment of this application, the information about the target AMF entity may be, for example, an address of the target AMF entity or a name of the target AMF entity. This is not specifically limited in this embodiment of this application.

Optionally, the information about the target AMF entity that is to serve the to-be-handed-over terminals may be alternatively sent by the target AMF entity to the access device. This is not specifically limited in this embodiment of this application.

S407. The source AMF entity sends, to the SMF entity, the information about the target AMF entity that is to serve the to-be-handed-over terminals, such that the SMF entity receives the information about the target AMF entity from the source AMF entity.

For a related description of the information about the target AMF entity, refer to step S406. Details are not described herein again.

Optionally, the information about the target AMF entity that is to serve the to-be-handed-over terminals may be alternatively sent by the target AMF entity to the SMF entity. This is not specifically limited in this embodiment of this application.

It should be noted that, this embodiment of this application is merely described using an example in which the source AMF entity sends the information about the target AMF entity to the SMF entity on the core network side. Certainly, the source AMF entity may alternatively send the information about the target AMF entity to a core network device other than the SMF entity, such as the UDM entity or the AUSF entity. This is not specifically limited in this embodiment of this application.

Optionally, in this embodiment of this application, the indication information 1 in step S404 and the information about the target AMF entity in step S406 may be sent to the access device using a same message, or may be sent to the access device using different messages. This is not specifically limited in this embodiment of this application.

Similarly, in this embodiment of this application, the indication information 1 in step S405 and the information about the target AMF entity in step S407 may be sent to the SMF entity using a same message, or may be sent to the SMF entity using different messages. This is not specifically limited in this embodiment of this application.

S408. The access device releases N2 interfaces of all terminals in connected mode in the to-be-handed-over terminals, but retains an N3 interface.

For example, the access device may determine the to-be-handed-over terminals based on the indication information 1. If the indication information 1 indicates that the source AMF entity is unavailable, it indicates that the to-be-handed-over terminals are all the terminals served by the source AMF entity. Alternatively, for example, if the indication information 1 indicates that a group identifier in the source AMF entity is unavailable, it indicates that the to-be-handed-over terminals are terminals in a terminal group corresponding to the group identifier in the terminals served by the source AMF entity.

S409. The SMF entity releases N11 interfaces of all the terminals in connected mode in the to-be-handed-over terminals.

For example, the SMF entity may determine the to-be-handed-over terminals based on the indication information 1. If the indication information 1 indicates that the source AMF entity is unavailable, it indicates that the to-be-handed-over terminals are all the terminals served by the source AMF entity. Alternatively, for example, if the indication information 1 indicates that a group identifier in the source AMF entity is unavailable, it indicates that the to-be-handed-over terminals are terminals in a terminal group corresponding to the group identifier in the terminals served by the source AMF entity.

S410. The target AMF entity receives a message related to a target terminal.

The message related to the target terminal may be an uplink message related to the target terminal, or may be a downlink message related to the target terminal. For details, refer to the description of the embodiment shown in FIG. 1. Details are not described herein again.

Optionally, in this embodiment of this application, the message related to the target terminal carries an identifier of the target terminal. In this embodiment of this application, the uplink message related to the target terminal and the downlink message related to the target terminal may carry different identifiers of the target terminal. For details, refer to the description of step S403. Details are not described herein again.

S411. The target AMF entity sends the message related to the target terminal to the source AMF entity based on the identifier list.

Optionally, that the target AMF entity sends the message related to the target terminal to the source AMF entity based on the identifier list may include: if the identifier list includes the identifier of the target terminal, the target AMF entity sends the message related to the target terminal to the source AMF entity. In other words, if the target terminal has an ongoing procedure in the source AMF entity, the target AMF entity sends the message related to the target terminal to the source AMF entity, and the source AMF entity continues to serve the target terminal, in order to ensure that the current procedure of the target terminal is not interrupted.

Optionally, the target AMF entity may determine, based on the identifier of the target terminal and a correspondence between the identifier of the target terminal and the information about the source AMF entity, the source AMF entity that serves the target terminal.

Optionally, after determining the source AMF entity that serves the target terminal, the target AMF entity may directly send the message related to the target terminal to the source AMF entity based on the address of the source AMF entity to the target AMF entity or the name of the source AMF entity in the information about the source AMF entity.

Alternatively, when the message related to the target terminal is the uplink message, after determining the source AMF entity that serves the target terminal, the target AMF entity may redirect the message related to the target terminal to the source AMF entity via the access device based on an address of the source AMF entity to the access device or the name of the source AMF entity in the information about the source AMF entity. When the message related to the target terminal is the downlink message, after determining the source AMF entity that serves the target terminal, the target AMF entity may redirect the message related to the target terminal to the source AMF entity via the SMF entity based on an address of the source AMF entity to the SMF entity or the name of the source AMF entity in the information about the source AMF entity. During redirection via the SMF entity, the target AMF entity sends the information about the source AMF entity to the SMF entity. Optionally, during redirection via the SMF entity, the target AMF entity may further send indication information to the SMF entity. The indication information is used to indicate that the information about the source AMF entity is used only for a current procedure (the "procedure" herein may also be referred to as a transaction) initiated by the SMF entity. After the current procedure ends, if the SMF entity needs to initiate a new procedure, the SMF entity still sends the message related to the target terminal to the target AMF entity.

Optionally, in this embodiment of this application, if the target AMF entity directly sends the message related to the target terminal to the source AMF entity, after the source AMF entity receives the message related to the target terminal, in a process of processing the message related to the target terminal, if a downlink message needs to be sent to the access device or the target terminal, the source AMF entity needs to re-establish an N2 interface between the access device and the source AMF entity, and then send the downlink message to the access device or the target terminal through the re-established N2 interface.

Alternatively, in this embodiment of this application, if the target AMF entity directly sends the downlink message related to the target terminal to the source AMF entity, after the source AMF entity receives the downlink message related to the target terminal, in a process of processing the message related to the target terminal, if a downlink message needs to be sent to the access device or the target terminal, the source AMF entity may send the downlink message to the access device or the target terminal using the target AMF entity through an N2 interface between the target AMF entity and the access device.

Alternatively, in this embodiment of this application, if the target AMF entity redirects the message related to the target terminal to the source AMF entity via the access device, after the source AMF entity receives the message related to the target terminal, in a process of processing the message related to the target terminal, if a downlink message needs to be sent to the access device or the target terminal, the source AMF entity may send the downlink message to the access device or the target terminal through an N2 interface established between the access device and the source AMF entity in a redirection process.

Optionally, in this embodiment of this application, if the target AMF entity directly sends the message related to the target terminal to the source AMF entity, after the source AMF entity receives the message related to the target terminal, in a process of processing the message related to the target terminal, if an uplink message needs to be sent to the SMF entity, the source AMF entity needs to re-establish an N11 interface between the SMF entity and the source AMF entity, and then send the uplink message to the SMF entity through the re-established N11 interface.

Alternatively, in this embodiment of this application, if the target AMF entity directly sends the message related to the target terminal to the source AMF entity, after the source AMF entity receives the message related to the target terminal, in a process of processing the message related to the target terminal, if an uplink message needs to be sent to the SMF entity, the source AMF entity may send the uplink message to the SMF entity using the target AMF entity through an N11 interface between the target AMF entity and the SMF entity.

Alternatively, in this embodiment of this application, if the target AMF entity redirects the message related to the target terminal to the source AMF entity via the SMF entity, after the source AMF entity receives the message related to the target terminal, in a process of processing the message related to the target terminal, if an uplink message needs to be sent to the SMF entity, the source AMF entity may send the uplink message to the SMF entity through an N11 interface established between the SMF entity and the source AMF entity in a redirection process.

S412. The source AMF entity determines that a procedure of the target terminal ends.

Optionally, that the procedure of the target terminal ends may be that a current ongoing procedure of the target terminal ends, or may be that another procedure after the end of a current ongoing procedure of the target terminal ends. For example, for a handover procedure, if the source AMF entity determines that after a handover procedure of the target terminal ends, re-registration needs to be performed immediately to update a tracking area (TA) list and re-allocate a GUTI, the source AMF entity hands over the target terminal to the target AMF entity only after the re-registration procedure ends. The re-registration herein is equivalent to a tracking area update (TAU).

S413. The source AMF entity sends a context of the target terminal to the target AMF entity, such that the target AMF entity receives the context of the target terminal from the source AMF entity.

S414. After receiving the context of the target terminal, the target AMF entity deletes a correspondence between an identifier of the target terminal and information about the source AMF entity.

After the correspondence between the identifier of the target terminal and the information about the source AMF entity is deleted, the source AMF entity no longer serves the target terminal. Further, after the target AMF entity receives the message related to the target terminal, the target AMF entity may serve the target terminal, instead of sending the message related to the target terminal to the source AMF entity.

Optionally, if the target AMF entity stores the information about the identifier list and the information about the source AMF entity, the deleting a correspondence between an identifier of the target terminal and information about the source AMF entity includes deleting the identifier of the target terminal from the identifier list.

Optionally, if the target AMF entity stores the identifier of the target terminal and the information about the source AMF entity, the deleting a correspondence between an identifier of the target terminal and information about the source AMF entity includes deleting a record of the correspondence between the identifier of the target terminal and the information about the source AMF entity.

S415. If an N2 interface between the access device and the source AMF entity is established in step S411, the target AMF entity sends an N2 interface update message to the access device, such that the access device receives the N2 interface update message from the target AMF entity, where the N2 interface update message is used to instruct the access device to update an N2 interface of the target terminal to the target AMF entity.

Optionally, the N2 interface update message may be alternatively sent by the source AMF entity to the access device, and the access device updates the N2 interface of the target terminal to the target AMF entity based on the N2 interface update message. This is not specifically limited in this embodiment of this application.

S416. If an N11 interface between the SMF entity and the source AMF entity is established in step S411, the target AMF entity sends an N11 interface update message to the SMF entity, such that the SMF entity receives the N11 interface update message from the target AMF entity, where the N11 interface update message is used to instruct the SMF entity to update an N11 interface of the target terminal to the target AMF entity.

Optionally, the N11 interface update message may be alternatively sent by the source AMF entity to the SMF entity, and the SMF entity updates the N11 interface of the target terminal to the target AMF entity based on the N11 interface update message. This is not specifically limited in this embodiment of this application.

In the handover method provided in this embodiment of this application, the source AMF entity sends, to the target AMF entity, the list of the identifiers of the terminals currently having the ongoing procedures in the served to-be-handed-over terminals, and after receiving the message related to the target terminal, the target AMF entity sends the message related to the target terminal to the source AMF entity based on the identifier list. After the source AMF entity determines that the procedure of the target terminal ends, the source AMF entity sends the context of the target terminal to the target AMF entity through the N14 interface between the source AMF entity and the target AMF entity, such that the target terminal can be handed over from the source AMF entity to the target AMF entity without interrupting the current procedure of the target terminal.

Actions of the target AMF entity in steps S401 to S416 may be performed by the processor 301 in the communications device 300 shown in FIG. 3 by invoking the application program code stored in the memory 303. This is not limited in this embodiment of this application.

Figure 5:
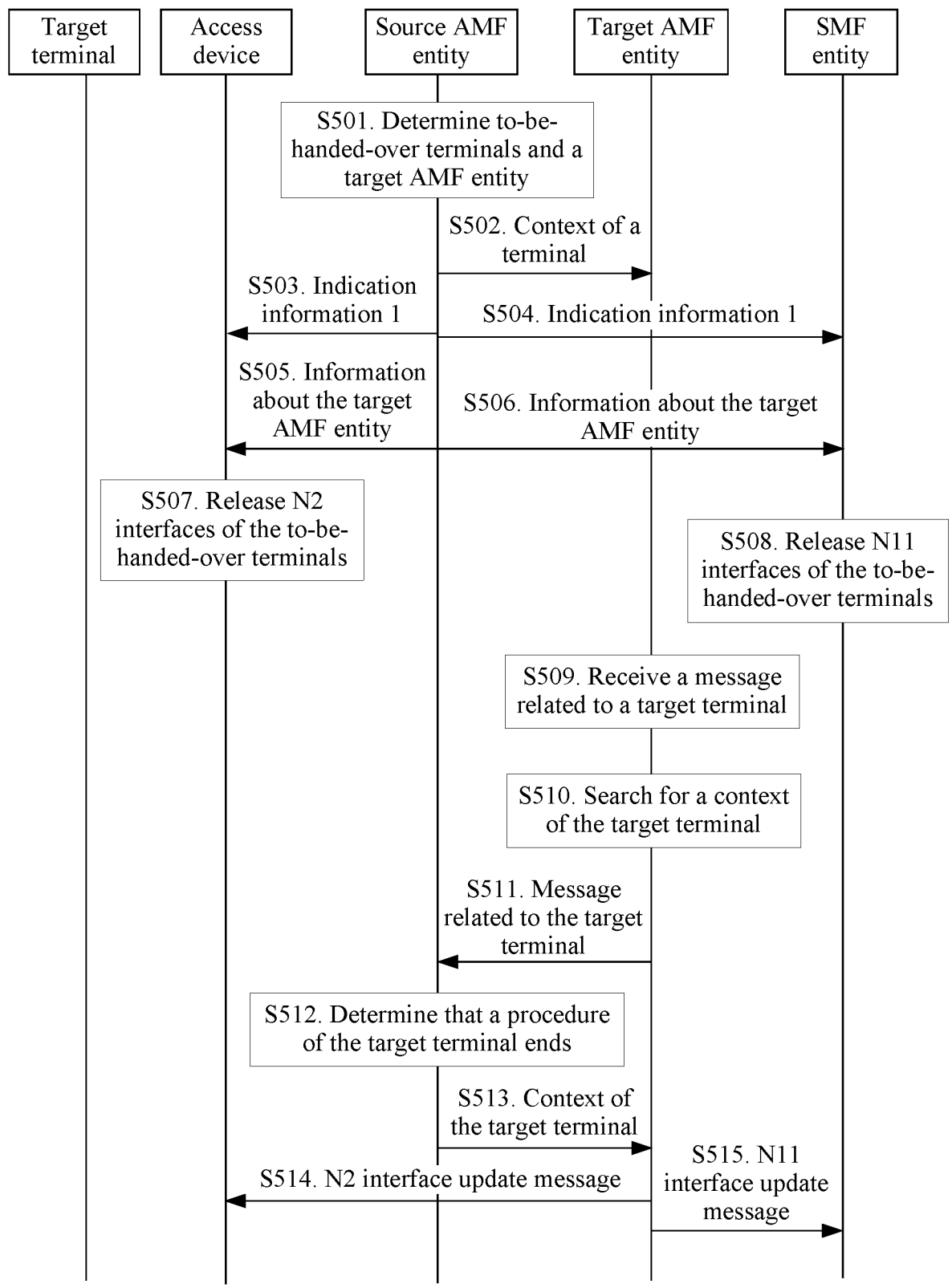
FIG. 5 is a schematic flowchart 2 of a handover method according to an embodiment of this application.

Optionally, for example, the handover system shown in FIG. 1 is applied to the 5G network shown in FIG. 2. It is assumed that a source AMF entity determines to move all or some terminals served by the source AMF entity to a target AMF entity due to upcoming shutdown, scale-down, or another reason, and the target AMF entity serves these terminals. FIG. 5 is a schematic flowchart of a handover method according to an embodiment of this application. In the handover method, after receiving a message related to a target terminal, the target AMF entity searches for a context of the target terminal based on an identifier of the target terminal that is carried in the message related to the target terminal, and if the context of the target terminal is not found, sends the message related to the target terminal to the source AMF entity. After the source AMF entity determines that a procedure of the target terminal ends, the source AMF entity sends the context of the target terminal to the target AMF entity through an N14 interface between the source AMF entity and the target AMF entity, such that the target terminal can be handed over from the source AMF entity to the target AMF entity without interrupting the current procedure of the target terminal. The handover method includes the following steps.

S501 is the same as step S401. For details, refer to the embodiment shown in FIG. 4. Details are not described herein again.

S502. The source AMF entity sends, to the target AMF entity, a context of a terminal currently having no ongoing procedure in the to-be-handed-over terminals, such that the target AMF entity receives the context of the terminal currently having no ongoing procedure.

Optionally, in this embodiment of this application, after receiving the context of the terminal currently having no ongoing procedure, the target AMF entity may store the context of the terminal currently having no ongoing procedure.

Optionally, in this embodiment of this application, the context of the terminal currently having no ongoing procedure includes a group identifier of at least one terminal group. A context of each terminal includes a group identifier of a terminal group in which the terminal is located. In this way, after receiving the context of the terminal currently having no ongoing procedure, the target AMF entity may store a correspondence between the group identifier of the at least one terminal group and information about the source AMF entity.

Optionally, in this embodiment of this application, the information about the source AMF entity may be sent to the target AMF entity together with the context of the terminal. For example, the information about the source AMF entity is sent to the target AMF entity together with the context of the terminal using a same message, or is sent to the target AMF entity as a source address of a message. Certainly, the information about the source AMF entity may be alternatively configured in the target AMF entity. For example, a correspondence between an IP address of the source AMF entity to the target AMF entity and the information about the source AMF entity is configured in the target AMF entity, such that the target AMF entity can query the correspondence based on a source IP address of a received message that carries the context of the terminal in step S502, to obtain the information about the source AMF entity. This is not specifically limited in this embodiment of this application.

S503 to S508 are the same as S404 to S409. For details, refer to the embodiment shown in FIG. 4. Details are not described herein again.

S509. The target AMF entity receives a message related to a target terminal.

For a description of the message related to the target terminal, refer to step S410. Details are not described herein again.

Optionally, in this embodiment of this application, the message related to the target terminal carries an identifier of the target terminal. In this embodiment of this application, an uplink message related to the target terminal and a downlink message related to the target terminal may carry different identifiers of the target terminal. For details, refer to the description of step S403. Details are not described herein again.

Optionally, in this embodiment of this application, the message related to the target terminal carries a group identifier of a terminal group in which the target terminal is located.

S510. The target AMF entity searches for a context of the target terminal based on an identifier of the target terminal.

S511. If the context of the target terminal is not found, the target AMF entity sends the message related to the target terminal to the source AMF entity, such that the source AMF entity receives the message related to the target terminal from the target AMF entity.

Alternatively, in this embodiment of this application, if the target AMF entity fails to find the context of the target terminal, and the group identifier of the at least one terminal group includes the group identifier of the terminal group in which the target terminal is located, the target AMF entity sends the message related to the target terminal to the source AMF entity. In other words, if the target terminal has an ongoing procedure in the source AMF entity, the target AMF entity sends the message related to the target terminal to the source AMF entity, and the source AMF entity continues to serve the target terminal, in order to ensure that the current procedure of the target terminal is not interrupted.

It should be noted that, in this embodiment of this application, the target AMF entity may determine, after failing to find the context of the target terminal, whether the group identifier of the at least one terminal group includes the group identifier of the terminal group in which the target terminal is located, or may search for the context of the target terminal after determining that the group identifier of the at least one terminal group includes the group identifier of the terminal group in which the target terminal is located. This is not specifically limited in this embodiment of this application.

Optionally, the target AMF entity may determine, based on the group identifier of the terminal group in which the target terminal is located and a correspondence between the group identifier of the terminal group in which the target terminal is located and the information about the source AMF entity, the source AMF entity that serves the target terminal.

Optionally, for an implementation in which the target AMF entity sends the message related to the target terminal to the source AMF entity, refer to step S411. Details are not described herein again.

S512 and S513 are the same as S412 and S413. For details, refer to the embodiment shown in FIG. 4. Details are not described herein again.

S514 and S515 are the same as S415 and S416. For details, refer to the embodiment shown in FIG. 4. Details are not described herein again.

In the handover method provided in this embodiment of this application, after receiving the message related to the target terminal, the target AMF entity searches for the context of the target terminal based on the identifier of the target terminal that is carried in the message related to the target terminal, and if the context of the target terminal is not found, sends the message related to the target terminal to the source AMF entity. After the source AMF entity determines that the procedure of the target terminal ends, the source AMF entity sends the context of the target terminal to the target AMF entity through the N14 interface between the source AMF entity and the target AMF entity, such that the target terminal can be handed over from the source AMF entity to the target AMF entity without interrupting the current procedure of the target terminal.

Actions of the target AMF entity in steps S501 to S515 may be performed by the processor 301 in the communications device 300 shown in FIG. 3 by invoking the application program code stored in the memory 303. This is not limited in this embodiment of this application.

Figure 6:
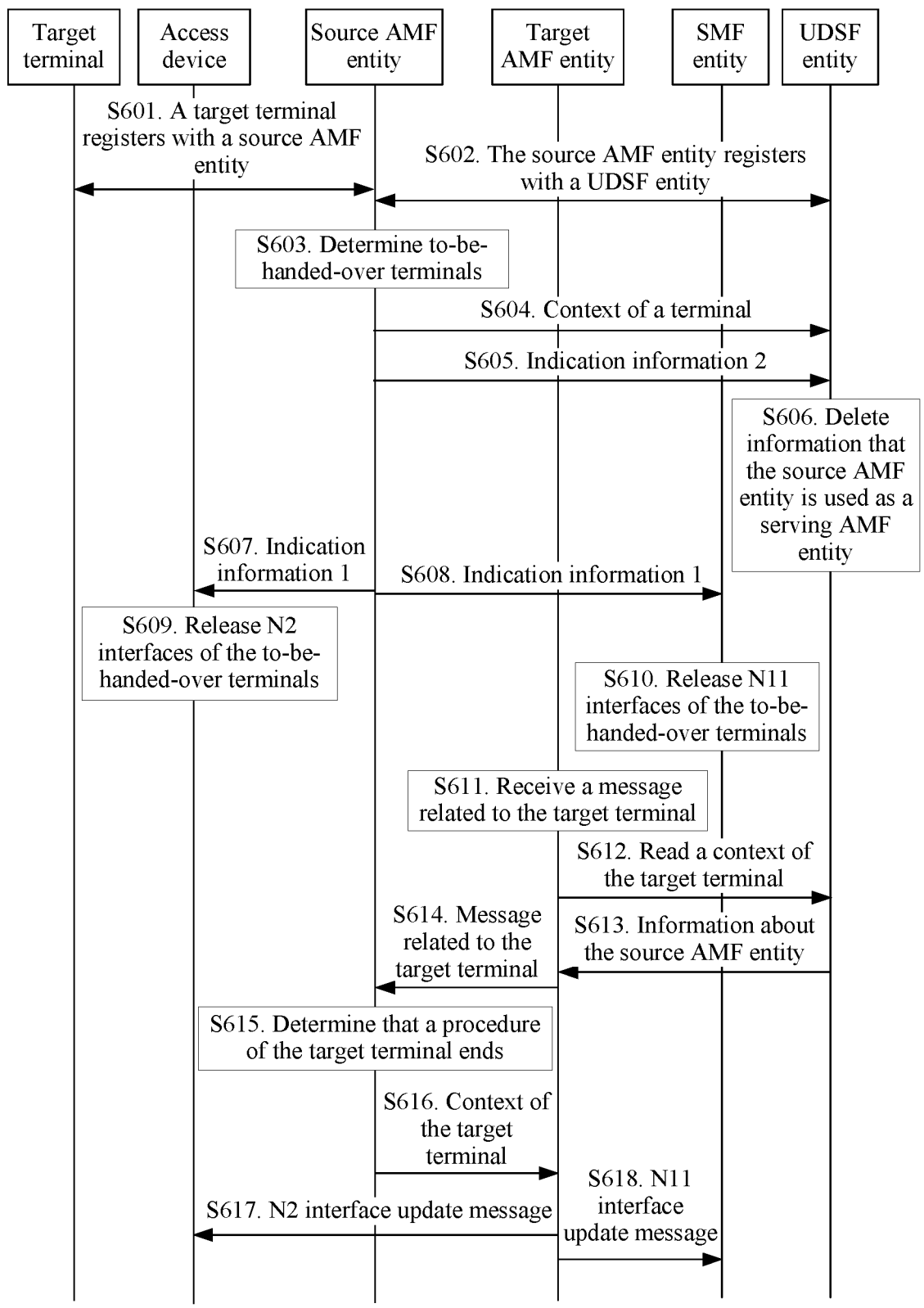
FIG. 6 is a schematic flowchart 3 of a handover method according to an embodiment of this application.

Optionally, for example, the handover system shown in FIG. 1 is applied to the 5G network shown in FIG. 2. It is assumed that a source AMF entity determines to move all or some terminals served by the source AMF entity to a target AMF entity due to upcoming shutdown, scale-down, or another reason, and the target AMF entity serves these terminals. FIG. 6 is a schematic flowchart of a handover method according to an embodiment of this application. In the handover method, after receiving a message related to a target terminal, the target AMF entity reads a context of the target terminal from a UDSF entity based on an identifier of the target terminal that is carried in the message related to the target terminal. If the target terminal is currently served by the source AMF entity, that is, the target terminal currently has an ongoing procedure, the UDSF entity sends information about the source AMF entity to the target AMF entity, such that the target AMF entity can send the message related to the target terminal to the source AMF entity based on the information about the source AMF entity. After the source AMF entity determines that a procedure of the target terminal ends, the source AMF entity sends the context of the target terminal to the target AMF entity through an N14 interface between the source AMF entity and the target AMF entity, or the source AMF entity stores the context of the target terminal into the UDSF entity, such that the target terminal can be handed over from the source AMF entity to the target AMF entity without interrupting the current procedure of the target terminal. The handover method includes the following steps.

S601. A target terminal registers with a source AMF entity.

For a procedure in which the target terminal registers with the source AMF entity, refer to an existing implementation. Details are not described herein.

S602. The source AMF entity registers with a UDSF entity.

That the source AMF entity registers with the UDSF entity is such that the source AMF entity registers with the UDSF entity as a serving AMF entity of the target terminal.

For a procedure in which the source AMF entity registers with the UDSF entity, refer to an existing implementation. Details are not described herein.

S603. The source AMF entity determines to-be-handed-over terminals.

For a related description of the to-be-handed-over terminals, refer to step S401. Details are not described herein again.

For related descriptions that the to-be-handed-over terminals register with the source AMF entity and that the source AMF entity registers with the UDSF entity, refer to the description that the target terminals register with the source AMF entity in step S601 and the description that the source AMF entity registers with the UDSF entity in step S602. Details are not described herein again.

S604. The source AMF entity sends, to the UDSF entity, a context of a terminal currently having no ongoing procedure in the to-be-handed-over terminals, such that the UDSF entity receives the context of the terminal currently having no ongoing procedure.

Optionally, in this embodiment of this application, after receiving the context of the terminal currently having no ongoing procedure, the UDSF entity may store the context of the terminal currently having no ongoing procedure.

Optionally, in this embodiment of this application, the context, sent by the source AMF entity to the UDSF entity, of the terminal currently having no ongoing procedure in the to-be-handed-over terminals may include only a latest context of the terminal, namely, a context different from a context of the terminal that is previously sent by the terminal to the UDSF entity. Currently, if the source AMF entity previously has sent, to the UDSF entity, the latest context of the terminal currently having no ongoing procedure in the to-be-handed-over terminals, in this step, the source AMF entity does not need to send the context of the terminal to the UDSF entity again.

S605. The source AMF entity sends indication information 2 to the UDSF entity, such that the UDSF entity receives the indication information 2 from the source AMF entity, where the indication information 2 is used to instruct the UDSF entity to delete information that the source AMF entity is used as a serving AMF entity of the terminal currently having no ongoing procedure.

S606. The UDSF entity deletes, based on the indication information 2, the information that the source AMF entity is used as the serving AMF entity of the terminal currently having no ongoing procedure.

Optionally, in this embodiment of this application, the context of the terminal in step S604 and the indication information 2 in step S605 may be sent to the UDSF entity using a same message, or may be sent to the UDSF entity using different messages. This is not specifically limited in this embodiment of this application.

S607 and S608 are the same as S404 and S405. For details, refer to the embodiment shown in FIG. 4. Details are not described herein again.

S609 and S610 are the same as S408 and S409. For details, refer to the embodiment shown in FIG. 4. Details are not described herein again.

S611 is the same as S410. For details, refer to the embodiment shown in FIG. 4. Details are not described herein again.

A difference from the embodiments shown in FIG. 4 and FIG. 5 is that, in the embodiments shown in FIG. 4 and FIG. 5, the source AMF entity determines the target AMF entity that is to serve the to-be-handed-over terminals, while in this embodiment of this application, an access device or an SMF entity first selects the target AMF entity for the target terminal before sending the message related to the target terminal to the target AMF entity.

S612. A target AMF entity reads a context of the target terminal from the UDSF entity based on an identifier of the target terminal.

S613. If the target terminal continues to be served by the source AMF entity currently, the UDSF entity sends information about the source AMF entity to the target AMF entity, such that the target AMF entity receives the information about the source AMF entity from the UDSF entity.

S614. The target AMF entity sends a message related to the target terminal to the source AMF entity based on the information about the source AMF entity, such that the source AMF entity receives the message related to the target terminal from the target AMF entity.

Optionally, for an implementation in which the target AMF entity sends the message related to the target terminal to the source AMF entity, refer to step S411. Details are not described herein again.

During redirection via the SMF entity, the target AMF entity sends the information about the source AMF entity to the SMF entity. Optionally, during redirection via the SMF entity, the target AMF entity may further send indication information to the SMF entity. The indication information is used to indicate that the information about the source AMF entity is used only for a current procedure initiated by the SMF entity. After the current procedure ends, if the SMF entity needs to initiate a new procedure, the SMF entity reselects an AMF entity for the target terminal, and then sends the message related to the target terminal to the AMF entity reselected for the target terminal.

S615 and S616 are the same as S412 and S413. For details, refer to the embodiment shown in FIG. 4. Details are not described herein again.

S617 and S618 are the same as S415 and S416. For details, refer to the embodiment shown in FIG. 4. Details are not described herein again.

Optionally, S617 and S618 in this embodiment of this application may be replaced with the following solution.

The source AMF entity stores the context of the target terminal into the UDSF entity, and deletes information that the source AMF entity is used as a serving AMF entity of the target terminal. In addition, the source AMF entity instructs the access device to release an N2 interface of the target terminal but retain an N3 interface, and the source AMF entity instructs the SMF entity to release an N11 interface of the target terminal.

In the handover method provided in this embodiment of this application, after receiving the message related to the target terminal, the target AMF entity reads the context of the target terminal from the UDSF entity based on the identifier of the target terminal that is carried in the message related to the target terminal. If the target terminal is currently served by the source AMF entity, that is, the target terminal currently has an ongoing procedure, the UDSF entity sends the information about the source AMF entity to the target AMF entity, such that the target AMF entity can send the message related to the target terminal to the source AMF entity based on the information about the source AMF entity. After the source AMF entity determines that the procedure of the target terminal ends, the source AMF entity sends the context of the target terminal to the target AMF entity through the N14 interface between the source AMF entity and the target AMF entity, or the source AMF entity stores the context of the target terminal into the UDSF entity, such that the target terminal can be handed over from the source AMF entity to the target AMF entity without interrupting the current procedure of the target terminal.

Actions of the target AMF entity in steps S601 to S617 may be performed by the processor 301 in the communications device 300 shown in FIG. 3 by invoking the application program code stored in the memory 303. This is not limited in this embodiment of this application.

The solutions provided in the embodiments of this application are mainly described above from the perspective of interaction between network elements. It may be understood that, to implement the foregoing functions, the target mobility management entity includes a corresponding hardware structure and/or software module for performing the foregoing functions. A person skilled in the art should be aware that, in combination with units and algorithms steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the target mobility management entity may be divided into functional modules based on the foregoing method examples. For example, the functional modules may be obtained through division corresponding to the functions, or two or more functions may be integrated into one processing module. The integrated module may be implemented in a form of hardware, or may be implemented in a form of a software functional module. It should be noted that, division of the modules in the embodiments of this application is an example, and is merely division of logical functions. During actual implementation, another division manner may be used.

Figure 7:
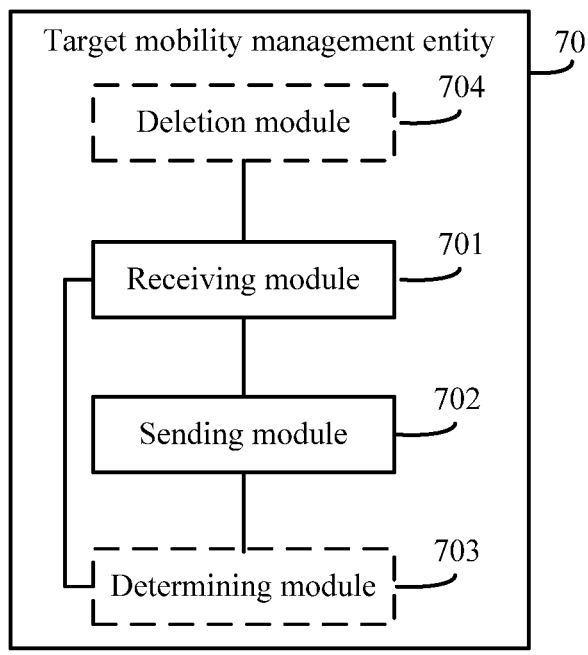
FIG. 7 is a schematic structural diagram 1 of a target mobility management entity according to an embodiment of this application.

For example, when the functional modules are divided based on the corresponding functions, FIG. 7 is a possible schematic structural diagram of a target mobility management entity 70 in the foregoing embodiment. The target mobility management entity 70 includes a receiving module 701 and a sending module 702. The receiving module 701 is configured to receive a message related to a target terminal. The sending module 702 is configured to send the message related to the target terminal to a source mobility management entity that currently serves the target terminal.

Optionally, the receiving module 701 is further configured to receive an identifier list from the source mobility management entity, where the identifier list is a list of identifiers of terminals currently having ongoing procedures in to-be-handed-over terminals served by the source mobility management entity. The sending module 702 is configured to send, based on the identifier list, the message related to the target terminal to the source mobility management entity that currently serves the target terminal.

Optionally, the message related to the target terminal carries an identifier of the target terminal. Correspondingly, the sending module 702 is configured such that if the identifier list includes the identifier of the target terminal, the sending module 702 sends the message related to the target terminal to the source mobility management entity that currently serves the target terminal.

Optionally, the message related to the target terminal carries the identifier of the target terminal. Correspondingly, as shown in FIG. 7, the target mobility management entity 70 further includes a determining module 703. The determining module 703 is configured to determine, based on the identifier of the target terminal and a correspondence between the identifier of the target terminal and information about the source mobility management entity, the source mobility management entity that serves the target terminal.

Optionally, as shown in FIG. 7, the target mobility management entity 70 may further include a deletion module 704. The deletion module 704 is configured such that after the receiving module 701 receives a context of the target terminal, the deletion module 704 deletes the correspondence between the identifier of the target terminal and the information about the source mobility management entity.

Optionally, the message related to the target terminal carries an identifier of the target terminal. Correspondingly, the sending module 702 is configured to: search for a context of the target terminal based on the identifier of the target terminal; and if the context of the target terminal is not found, send the message related to the target terminal to the source mobility management entity that currently serves the target terminal.

Optionally, the message related to the target terminal carries a group identifier of a terminal group in which the target terminal is located. The receiving module 701 is further configured to receive a context of at least one terminal from the source mobility management entity, where the context of the at least one terminal includes a group identifier of at least one terminal group, and a context of each terminal in the context of the at least one terminal includes a group identifier of a terminal group in which the terminal is located. The sending module 702 is configured such that if the context of the target terminal is not found, and the group identifier of the at least one terminal group includes the group identifier of the terminal group in which the target terminal is located, the sending module 702 sends the message related to the target terminal to the source mobility management entity that currently serves the target terminal.

Optionally, the message related to the target terminal carries the group identifier of the terminal group in which the target terminal is located. Correspondingly, as shown in FIG. 7, the target mobility management entity 70 further includes a determining module 703. The determining module 703 is configured to determine, based on the group identifier of the terminal group in which the target terminal is located and a correspondence between the group identifier of the terminal group in which the target terminal is located and information about the source mobility management entity, the source mobility management entity that serves the target terminal.

Optionally, the receiving module 701 is further configured to receive the information about the source mobility management entity from the source mobility management entity.

Optionally, the determining module 703 is further configured to determine the information about the source mobility management entity based on configuration information.

Optionally, the message related to the target terminal is a downlink message, and the sending module 702 is configured to send, to a session management entity, the message related to the target terminal and the information about the source mobility management entity that currently serves the target terminal, where the information about the source mobility management entity is used by the session management entity to send the message related to the target terminal to the source mobility management entity.

Optionally, the sending module 702 is further configured to send indication information to the session management entity, where the indication information is used to indicate that the information about the source mobility management entity is used only for a current procedure initiated by the session management entity.

Figure 8:
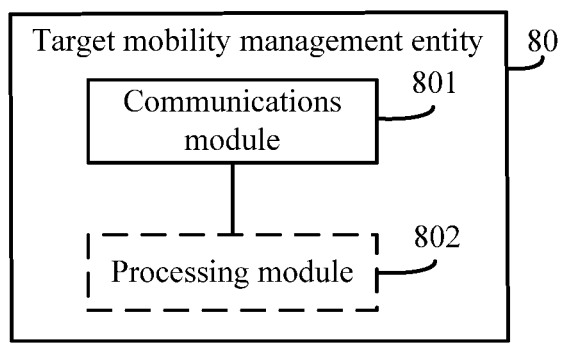
FIG. 8 is a schematic structural diagram 2 of a target mobility management entity according to an embodiment of this application.

When the functional modules are divided in an integrated manner, FIG. 8 is a possible schematic structural diagram of a target mobility management entity 80 in the foregoing embodiment. The target mobility management entity 80 includes a communications module 801. Optionally, the target mobility management entity 80 may further include a processing module 802. The communications module 801 may be configured to perform operations that can be performed by the receiving module 701 and the sending module 702 in FIG. 7. The processing module 802 may be configured to perform operations that can be performed by the determining module 703 and the deletion module 704 in FIG. 7. For details, refer to the embodiment shown in FIG. 7. Details are not described herein again in this embodiment of this application.

All related content of steps in the foregoing method embodiments may be cited in function descriptions of corresponding functional modules. Details are not described herein again.

In this embodiment, the target mobility management entity is presented through division of the functional modules based on the corresponding functions, or presented through division of the functional modules in an integrated manner. The "module" herein may be an application-specific integrated circuit (ASIC) circuit, a processor for executing one or more software or firmware programs, a memory, an integrated logic circuit, and/or another device that can provide the foregoing function. In a simple embodiment, a person skilled in the art may be aware that the target mobility management entity 70 or the target mobility management entity 80 may be in a form shown in FIG. 3. For example, the receiving module 701, the sending module 702, the determining module 703, and the deletion module 704 in FIG. 7 may be implemented using the processor 301 and the memory 303 in FIG. 3. In some implementations, the receiving module 701, the sending module 702, the determining module 703, and the deletion module 704 may be executed by the processor 301 by invoking the application program code stored in the memory 303. This is not limited in this embodiment of this application. Alternatively, for example, the processing module 802 and the communications module 801 in FIG. 8 may be implemented using the processor 301 and the memory 303 in FIG. 3. In some implementations, the processing module 802 and the communications module 801 may be executed by the processor 301 by invoking the application program code stored in the memory 303. This is not limited in this embodiment of this application.

Because the target mobility management entity provided in this embodiment of this application may be configured to perform the foregoing handover method, for technical effects that can be achieved by the target mobility management entity, refer to the foregoing method embodiments. Details are not described herein again.

Optionally, an embodiment of this application provides a chip system. The chip system includes a processor, configured to support a target mobility management entity in implementing functions in the foregoing aspect, for example, receiving a message related to a target terminal, and sending the message related to the target terminal to a source mobility management entity. In a possible design, the chip system further includes a memory. The memory is configured to store a program instruction and data that are necessary for the target mobility management entity. The chip system may include a chip, or may include a chip and another discrete device. This is not specifically limited in this embodiment of this application.

All or some of the foregoing embodiments may be implemented using software, hardware, firmware, or any combination thereof. When implemented using a software program, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

Although this application is described in this specification with reference to the embodiments, in a process of implementing this application that claims protection, a person skilled in the art may understand and implement other variations of the disclosed embodiments by viewing the accompanying drawings, disclosed content, and the appended claims. In the claims, "comprising" does not exclude another component or step, and "a" or "one" does not exclude a case of "a plurality of". A single processor or another unit may implement functions enumerated in the claims. Some measures are recorded in dependent claims that are different from each other, but this does not mean that these measures cannot be combined to produce a better effect.

Although this application is described with reference to example features and the embodiments thereof, various modifications and combinations may be made to them without departing from the spirit and scope of this application. Correspondingly, the specification and accompanying drawings are merely example description of this application defined by the accompanying claims, and are considered as covering any of or all modifications, variations, combinations, or equivalents within the scope of this application. A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A handover method, comprising:
   receiving, by a target mobility management entity, a message about a transaction related to a target terminal;
   searching, by the target mobility management entity, for a context of the target terminal; and
   sending, by the target mobility management entity when the target mobility management entity fails to find the context of the target terminal, information about a source mobility management entity that serves the target terminal to a core network device, wherein the information about the source mobility management entity is for enabling the core network device to send the message related to the target terminal to the source mobility management entity.

2. The handover method according to claim 1, further comprising sending indication information to the core network device, wherein the indication information indicates that the information about the source mobility management entity is only for the transaction initiated by the core network device.

3. The handover method according to claim 1, further comprising receiving the information about the source mobility management entity from the source mobility management entity.

4. The handover method according to claim 1, wherein the core network device is one of a session management entity, a unified data management entity, or an authentication server function entity.

5. The handover method according to claim 1, wherein the message related to the target terminal comprises a group identifier of a terminal group to which the target terminal belongs, and wherein the method further comprises determining, based on the group identifier and a correspondence between the group identifier and the information about the source mobility management entity, the source mobility management entity that serves the target terminal.

6. The handover method according to claim 1, wherein the message related to the target terminal is a downlink message related to the target terminal.

7. The handover method according to claim 6, wherein the downlink message is from a network device to one of an access device, the target terminal, or the target mobility management entity.

8. A target mobility management entity, comprising:
   at least one processor; and
   a memory storing computer-executable instructions that, when executed by the at least one processor, instruct the at least one processor to:
   receive a message about a transaction related to a target terminal;

search for a context of the target terminal; and
send, when the target mobility management entity fails to find the context of the target terminal, information about a source mobility management entity that serves the target terminal to a core network device, wherein the information about the source mobility management entity is for enabling the core network device to send the message related to the target terminal to the source mobility management entity.

9. The target mobility management entity according to claim 8, wherein the computer-executable instructions, when executed by the at least one processor, further instruct the at least one processor to send indication information to the core network device, wherein the indication information indicates that the information about the source mobility management entity is only for the transaction initiated by the core network device.

10. The target mobility management entity according to claim 8, wherein the computer-executable instructions, when executed by the at least one processor, further instruct the at least one processor to receive the information about the source mobility management entity from the source mobility management entity.

11. The target mobility management entity according to claim 8, wherein the computer-executable instructions, when executed by the at least one processor, further instruct the at least one processor to determine, based on a group identifier of a terminal group to which the target terminal belongs and a correspondence between the group identifier of the terminal group and the information about the source mobility management entity, the source mobility management entity that serves the target terminal.

12. The target mobility management entity according to claim 8, wherein the information about the source mobility management entity is a name of the source mobility management entity.

13. The target mobility management entity according to claim 8, wherein the message related to the target terminal is a downlink message related to the target terminal.

14. A communication system, comprising:
a target mobility management entity configured to:
receive a message about a transaction related to a target terminal;
search for a context of the target terminal; and
send, when the target mobility management entity fails to find the context of the target terminal, information about a source mobility management entity that serves the target terminal; and
a core network device configured to:
receive the information about the source mobility management entity from the target mobility management entity; and
send, based on the information about the source mobility management entity, the message related to the target terminal to the source mobility management entity.

15. The communication system according to claim 14, wherein the target mobility management entity is further configured to send indication information to the core network device, wherein the indication information indicates that the information about the source mobility management entity is only for the transaction initiated by the core network device, and wherein the core network device is further configured to receive the indication information.

16. The communication system according to claim 14, wherein the source mobility management entity is further configured to send the information about the source mobility management entity to the target mobility management entity, and wherein the target mobility management entity is further configured to receive the information about the source mobility management entity.

17. The communication system according to claim 14, wherein the core network device is one of a session management entity, a unified data management entity, or an authentication server function entity.

18. The communication system according to claim 14, wherein the message related to the target terminal comprises a group identifier of a terminal group to which the target terminal belongs, wherein the target mobility management entity is further configured to determine, based on the group identifier of the terminal group and a correspondence between the group identifier of the terminal group and the information about the source mobility management entity, the source mobility management entity that serves the target terminal.

19. The handover method according to claim 1, wherein the information about the source mobility management entity is a name of the source mobility management entity.

20. The handover method according to claim 1, wherein the information about the source mobility management entity is an address of the source mobility management entity.

21. The communication system according to claim 14, wherein the information about the source mobility management entity is a name of the source mobility management entity.

22. The communication system according to claim 15, wherein the core network device is further configured to send a second message related to the target terminal to the target mobility management entity after the transaction ends.

* * * * *